United States Patent
Shim et al.

(10) Patent No.: US 9,164,703 B2
(45) Date of Patent: Oct. 20, 2015

(54) SOLID STATE DRIVE INTERFACE CONTROLLER AND METHOD SELECTIVELY ACTIVATING AND DEACTIVATING INTERFACES AND ALLOCATING STORAGE CAPACITY TO THE INTERFACES

(71) Applicant: SAMSUNG ELECTRONICS CO., LTD., Suwon-Si, Gyeonggi-Do (KR)

(72) Inventors: Ho Jun Shim, Yongin-Si (KR); Je-Hyuck Song, Seoul (KR); Kwang Gu Lee, Seongnam-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 225 days.

(21) Appl. No.: 13/827,347

(22) Filed: Mar. 14, 2013

(65) Prior Publication Data

US 2013/0254455 A1     Sep. 26, 2013

(30) Foreign Application Priority Data

Mar. 21, 2012  (KR) .................. 10-2011-0028871

(51) Int. Cl.
*G06F 3/06* (2006.01)
*G06F 12/02* (2006.01)

(52) U.S. Cl.
CPC ............ *G06F 3/0679* (2013.01); *G06F 3/0607* (2013.01); *G06F 3/0632* (2013.01); *G06F 3/0625* (2013.01); *Y02B 60/1246* (2013.01)

(58) Field of Classification Search
CPC . G06F 12/0246; G06F 3/0625; G06F 3/0679; G06F 1/3275; G06F 1/3278; G06F 1/3287; G06F 13/1668; Y02B 60/1225; Y02B 60/1239; Y02B 60/1246; Y02B 60/1282
See application file for complete search history.

(56) References Cited

U.S. PATENT DOCUMENTS

| | | | |
|---|---|---|---|
| 7,249,213 B2 | 7/2007 | Feng et al. | |
| 7,356,637 B2 | 4/2008 | Tee et al. | |
| 7,584,304 B2 | 9/2009 | Lee et al. | |
| 2007/0124621 A1* | 5/2007 | Kim | 713/323 |
| 2010/0077117 A1 | 3/2010 | Asnaashari | |
| 2010/0274953 A1* | 10/2010 | Lee et al. | 711/103 |
| 2010/0293305 A1* | 11/2010 | Park et al. | 710/33 |
| 2011/0066872 A1* | 3/2011 | Miller et al. | 713/340 |
| 2011/0239009 A1* | 9/2011 | Noda | 713/300 |
| 2012/0054518 A1* | 3/2012 | Sadowski et al. | 713/322 |

FOREIGN PATENT DOCUMENTS

KR        0640588       10/2006

* cited by examiner

*Primary Examiner* — Sanjiv Shah
*Assistant Examiner* — Glenn Gossage
(74) *Attorney, Agent, or Firm* — Volentine & Whitt, PLLC (57) ABSTRACT

A solid state drive (SSD) interface controller includes a host interface, first and second command interfaces, and an interface information storage unit. The interface information storage unit is configured to store information for determining activation or deactivation of each of the first and second command interfaces, and a capacity allocated to each of the first and second command interfaces. The interface information storage unit may comprise first and second registers storing interface information, which may be changed in response to an extension ROM BIOS executed during a booting operation. The command interfaces may be configured to communicate using interface protocols such as SATA, SATA express, or nonvolatile express. An interface power management unit may cut power to an interface when deactivated based on the stored interface information.

20 Claims, 8 Drawing Sheets

SOLID STATE DRIVE INTERFACE CONTROLLER AND METHOD SELECTIVELY ACTIVATING AND DEACTIVATING INTERFACES AND ALLOCATING STORAGE CAPACITY TO THE INTERFACES

CROSS-REFERENCE TO RELATED APPLICATIONS

A claim of priority under 35 U.S.C. §119 is made to Korean Patent Application No. 10-2012-0028871 filed on Mar. 21, 2012, in the Korean Intellectual Property Office, the entire contents of which are hereby incorporated by reference.

BACKGROUND

Embodiments of the inventive concept relate to a solid state drive (SSD) interface controller, and more particularly, to an SSD interface controller for efficiently managing interfaces communicating data with an SSD and a control method thereof.

Hard disks store data using a magnetic storage method. Such hard disks generally have low durability. For instance, an impact force applied to a hard disk may result in a bad sector and lost data. Also, a hard disk includes a disk rotated by a motor, and reading speeds differ between the inner portions and the outer portions of the disk. Therefore, data read/write times are not consistent.

SSDs were developed to overcome these problems. SSDs include memory, such as flash memory, as a storage device. Data can be processed in parallel in SSDs, avoiding a bottleneck effect in computers. Also, since SSDs do not require spindle motors having high power consumption, the SSDs increase power efficiency of systems as compared to the hard disks. SSDs may require controllers to control operations. A controller usually includes an interface that allows data communication with the SSD. Recently, development of faster interfaces has been in progress to increase performance and speed of systems. An approach for effectively managing such interfaces is desired.

SUMMARY

Embodiments of the inventive concept provide a solid state drive (SSD) controller for efficiently managing an interface communicating data with an SSD and a control method thereof.

According to an embodiment of the inventive concept, a solid state drive (SSD) interface controller includes a host interface, first and second command interfaces, and an interface information storage unit. The host interface is configured to communicate data with a host device. The first command interface is configured to communicate data between the host interface and an SSD, and the second command interface is configured to communicate data between the host interface and the SSD independently of the first command interface. The interface information storage unit is configured to store information for determining activation or deactivation of each of the first and second command interfaces, and a capacity allocated to each of the first and second command interfaces.

According to another embodiment of the inventive concept, a method is provided for controlling communication of data between a host and an SSD. The method includes receiving first interface information corresponding to a first command interface from an interface information storage unit; receiving second interface information corresponding to a second command interface from the interface information storage unit; determining a first activation status and a first allocated capacity of the first command interface according to the first interface information, the first allocated capacity corresponding to a portion of a total capacity of the SSD; determining a second activation status and a second allocated capacity of the second command interface according to the second interface information; and communicating the data between the host and the SSD via at least one of the first and second command interfaces in accordance with the first and second activation statuses and the first and second allocated capacities, respectively.

According to another embodiment of the inventive concept, an SSD interface controller includes multiple command interfaces, multiple registers, and an interface power management unit. The command interfaces are configured to communicate data between a host interface and an SSD. The registers are configured to store interface information corresponding to the command interfaces, the interface information indicating whether each of the command interfaces is activated or deactivated, and allocating a capacity to each of the command interfaces, each capacity corresponding to a portion of a total capacity of the SSD. The interface power management unit is configured to remove power from each of the command interfaces that is deactivated according to the corresponding interface information.

BRIEF DESCRIPTION OF THE DRAWINGS

Exemplary embodiments will be more clearly understood from the following detailed description taken in conjunction with the accompanying drawings, in which.

DETAILED DESCRIPTION OF THE EMBODIMENTS

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. In the drawings, the size and relative sizes may be exaggerated for clarity. Unless otherwise noted, like reference numerals denote like elements throughout the attached drawings and written description, and thus descriptions will not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms "first," "second", etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
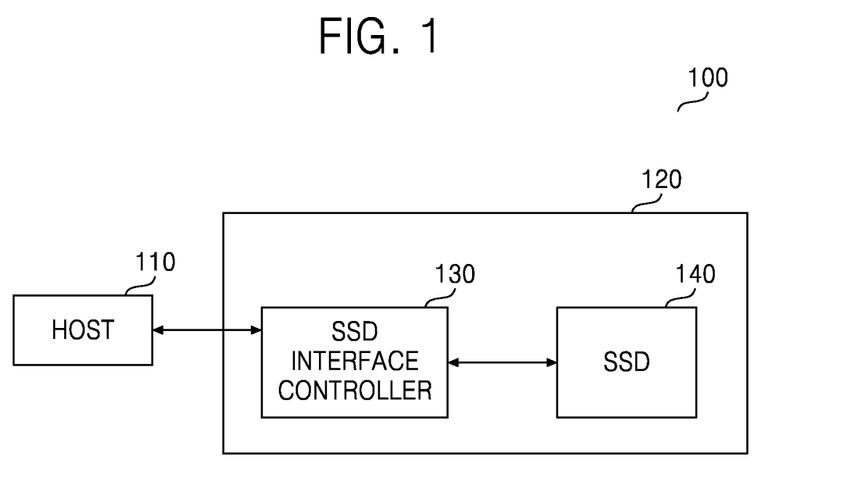
FIG. 1 is a block diagram of a computer system, according to embodiments of the inventive concept.

FIG. 1 is a block diagram of a computer system, according to embodiments of the inventive concept.

Referring to FIG. 1, computer system 100 includes a host 110 and a solid state drive (SSD) chip 120. The host 110 may process various commands necessary for the operation of the computer system 100 and transmit the commands to the SSD chip 120. The host 110 may also retrieve wanted data from the SSD chip 120 or store data in the SSD chip 120. The SSD chip 120 includes an SSD interface controller 130 and an SSD 140.

The SSD interface controller 130 is configured to read data from the SSD 140 and to transmit the data to the host 110 in response to a read command received from the host 110. In addition, the SSD interface controller 130 is configured to store data transmitted from the host 110 in the SSD 140 in response to a write command received from the host 110. The SSD interface controller 130 may communicate commands and data with the host 110 using a peripheral component interconnect express (PCIe) protocol, for example, but the inventive concept is not restricted thereto.

In the depicted embodiment, the SSD interface controller 130 includes at least two command interfaces to communicate data with the SSD 140, indicated as representative first command interface 160 and second command interface 170 in the illustrative embodiment of FIG. 2, discussed below. The SSD 140 may further include a dedicated SSD controller for controlling operations of non-volatile memories in the SSD 140, although in an embodiment, the SSD interface controller 130 may serve as the SSD controller for the SSD 140. For example, the SSD interface controller 130 (and/or the SSD controller) may perform various functions, such as providing a logical address of the SSD 140 to the host 110, providing a physical address to the SSD 140, managing the SSD 140 using the physical address, and converting the physical address into the logical address. The SSD interface controller 130 (and/or the SSD controller) may form blocks having logically the same block number in multiple non-volatile memories into a logical unit, i.e., a block group, may form pages having logically the same page number in the non-volatile memories into a logical unit, i.e., a page group, and may perform a logic operation on the logical units. At this time, the SSD interface controller 130 (and/or the SSD controller) may perform a read/write operation on the page group in parallel in the non-volatile memories and may perform an erase operation on the block group in parallel in the non-volatile memories. The detailed internal structure of the SSD interface controller 130 will be described below.

The SSD 140 is a storage device including multiple non-volatile memories. The SSD 140 may store data received from the SSD interface controller 130 (in a write operation) and may provide data to the SSD interface controller 130 (in a read operation). In addition, the SSD 140 may erase data under control of the SSD interface controller 130. The multiple non-volatile memories may store or provide data in parallel through one or more buses at the request of the SSD interface controller 130. The SSD 140 may be designed as a multi-function PCIe device that can support at least two command interfaces, for example. The non-volatile memories may include flash memory, phase-change random access memory (PRAM), or resistive random access memory (RRAM), but the inventive concept is not restricted thereto. As mentioned above, the SSD 140 may further include a dedicated SSD controller. In an embodiment, the SSD interface controller 130 may serve as the SSD controller for the SSD 140. Dynamic random access memory (DRAM) may be also provided as a buffer (not shown) between the SSD interface controller 130 and the SSD 140 to increase a data transmission speed and work efficiency.

Figure 2:
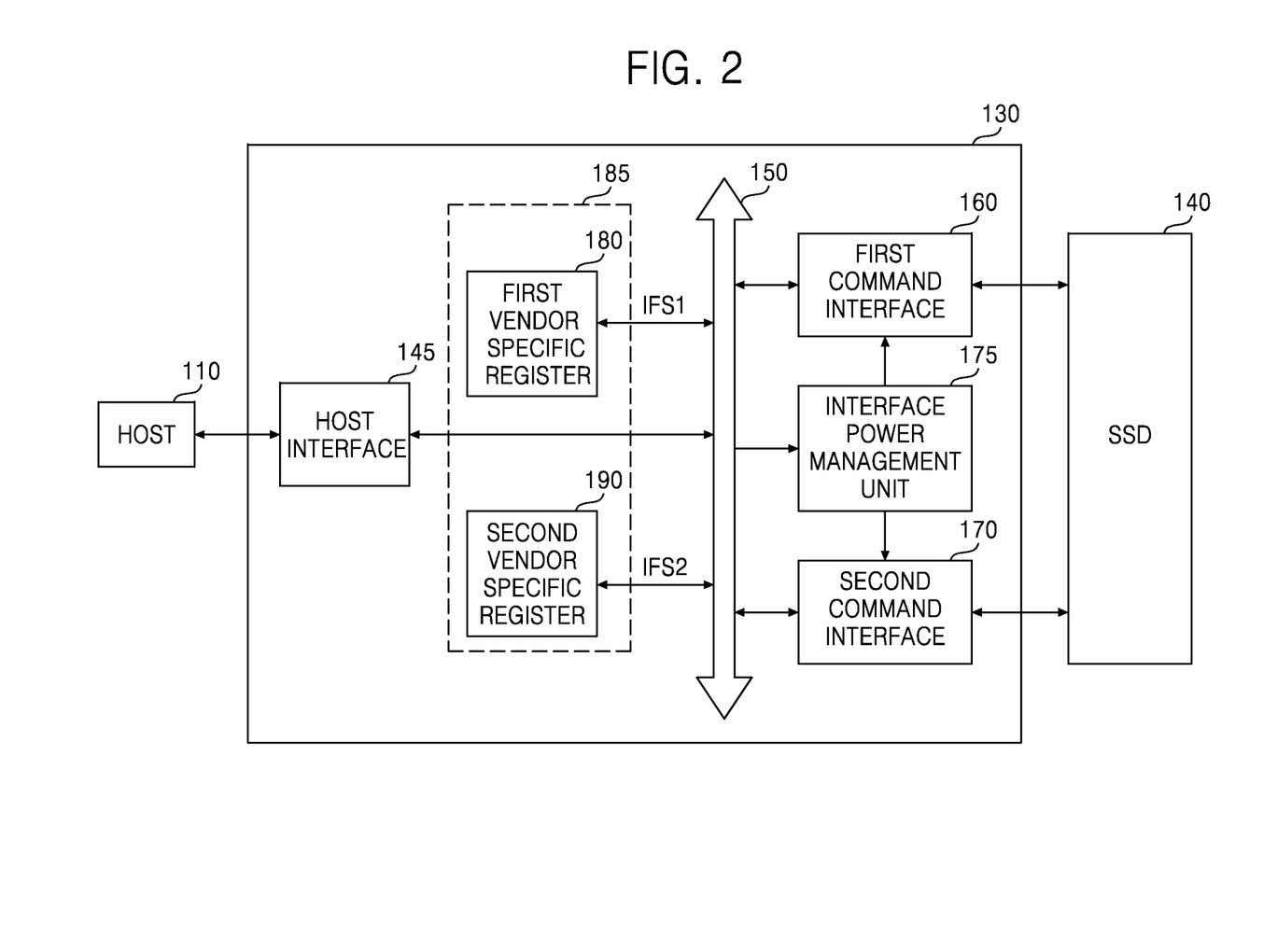
FIG. 2 is a block diagram of a solid state drive (SSD) controller, according to embodiments of the inventive concept.

FIG. 2 is a block diagram of the SSD interface controller 130, according to embodiments of the inventive concept. Referring to FIG. 2, the SSD interface controller 130 includes a host interface 145, an address translation layer (not shown), an inner bus 150, a first command interface 160, a second command interface 170, an interface power management unit 175, and an interface information storage unit 185.

The host interface 145 may receive commands (e.g., a read command, a write command, and an erase command) and data from the host 110. The host interface 145 may also receive data read from the SSD 140 through the inner bus 150 and transmit the data to the host 110. The host interface 145 may be implemented by an interface module using various interfaces, such as the PCIe protocol, universal serial bus (USB) protocol, multimedia card (MMC) protocol, serial advanced technology attachment (SATA) protocol, SATA express (SATAe), non-volatile memory express (NVMe) protocol, parallel advanced technology attachment (PATA) protocol, small computer system interface (SCSI) protocol, enhanced small device interface (ESD) protocol, and/or intelligent drive electronics (IDE) protocol, for example, but the inventive concept is not restricted thereto.

The address translation layer performs conversion between a physical address and a logical address. The address translation layer may map data having a logical address from the host to data having a physical address to enable data transmission between the host 110 and the SSD 140.

The inner bus 150 transmits commands and data from elements in the SSD interface controller 130. The transmission of commands and data within the SSD interface controller 130 can be performed at high speed through the inner bus 150.

The first command interface 160 performs data transmission between the SSD interface controller 130 and the SSD 140, and may include a pointer (not shown) corresponding to a physical address of a page of each of the non-volatile memories included in the SSD 140. The first command interface 160 may receive data stored in the SSD 140 and transmit it to the inner bus 150 in response to a read command of the host 110. The first command interface 160 may also receive data from the inner bus 150 and store it in the SSD 140 in response to a write command of the host 110.

Whether the first command interface 160 is activated and how much capacity is allocated to the first command interface 160 is determined by first interface information IFS1 stored in a first vendor specific register 180 in the interface information storage unit 185, described below. The first interface information IFS1 includes information that indicates activation or deactivation of the first command interface 160, and/or allocated capacity of the first command interface 160. The allocated capacity corresponds to a portion of the total capacity of the SSD 140. When the first command interface 160 is activated after system booting, data transmission may be performed with respect to the allocated capacity. The first command interface 160 may support serial advanced technology attachment (SATA) protocol, SATA express protocol, or non-volatile memory express protocol, but the inventive concept is not restricted thereto.

The second command interface 170 performs data transmission between the SSD interface controller 130 and the SSD 140 independently of the first command interface 160, and may include a pointer (not shown) corresponding to a physical address of a page of each of the non-volatile memories included in the SSD 140. The second command interface 170 may receive data stored in the SSD 140 and transmit it to the inner bus 150 in response to a read command of the host 110. The second command interface 170 may also receive data from the inner bus 150 and store it in the SSD 140 in response to a write command of the host 110.

Whether the second command interface 170 is activated and how much capacity is allocated to the second command interface 170 is determined by second interface information IFS2 stored in a second vendor specific register 190 in the interface information storage unit 185, described below. The second interface information IFS2 includes information that indicates activation or deactivation of the second command interface 170, and/or allocated capacity of the second command interface 170. The allocated capacity corresponds to another portion of the total capacity of the SSD 140. In an embodiment, the sum of the allocated capacity of the first command interface 160 and the allocated capacity of the second command interface 170 is the same as the total capacity of the SSD 140. When the second command interface 170 is activated after system booting, data transmission may be performed with respect to the allocated capacity of the SSD 140. The second command interface 170 may support SATA, SATA express, or non-volatile memory express, but the inventive concept is not restricted thereto. Further, the second command interface 170 may support a protocol different from that of the first command interface 160.

In an embodiment, when either of the first and second command interfaces 160 and 170 is deactivated based on the first interface information IFS1 and the second interface information IFS2, respectively, the interface power management unit 175 cuts off power supply to the deactivated interface 160 or 170. For example, when a bit that determines activation or deactivation in the first or second interface information IFS1 or IFS2 is logic low, the interface 160 or 170 may be deactivated, and when the bit is logic high, the interface 160 or 170 may be activated. For instance, when the bit determining activation or deactivation in the first interface information IFS1 is logic low and the bit determining activation or deactivation in the second interface information IFS2 is logic high, the interface power management unit 175 may cut off the power supply to the first command interface 160 only. The power cut off may be realized using a power gating circuit or a switching unit, for example. As described above, power efficiency of the computer system 100 is increased by cutting off power supply to an interface that has been deactivated.

The interface information storage unit 185 stores information for determining activation or deactivation of each of at least two command interfaces and capacity of the SSD 140 allocated to each command interface. In the depicted embodiment, the interface information storage unit 185 includes the first vendor specific register 180 and the second vendor specific register 190, although a different number of vendor specific registers may be included. A vendor specific register is a register that a user can additionally use for a specific function.

The first vendor specific register 180 stores the first interface information IFS1 that determines the activation or deactivation and the allocated capacity of the first command interface 160. When an extension (or expansion) read-only memory basic input/output system (ROM BIOS), which will be described later, is input by a user during system booting, it may be necessary to change the activation or deactivation and/or the allocated capacity of an SSD interface, e.g., the first command interface 160. In this case, the first interface information IFS1 stored in the first vendor specific register 180 may be reset to a value set by the user.

The second vendor specific register 190 stores the second interface information IFS2 that determines the activation or deactivation and the allocated capacity of the second command interface 170. When the extension ROM BIOS is input by a user during system booting, it may be necessary to change the activation or deactivation and/or the allocated capacity of an SSD interface, e.g., the second command interface 170. In this case, the second interface information IFS2 stored in the second vendor specific register 190 may be reset to a value set by the user.

The SSD interface controller 130, according to embodiments of the inventive concept, determines activation or deactivation and allocated capacity of multiple interfaces based on interface information stored in the interface information storage unit 185, thereby realizing efficient data transmission between the host 110 and the SSD 140.

Figure 3:
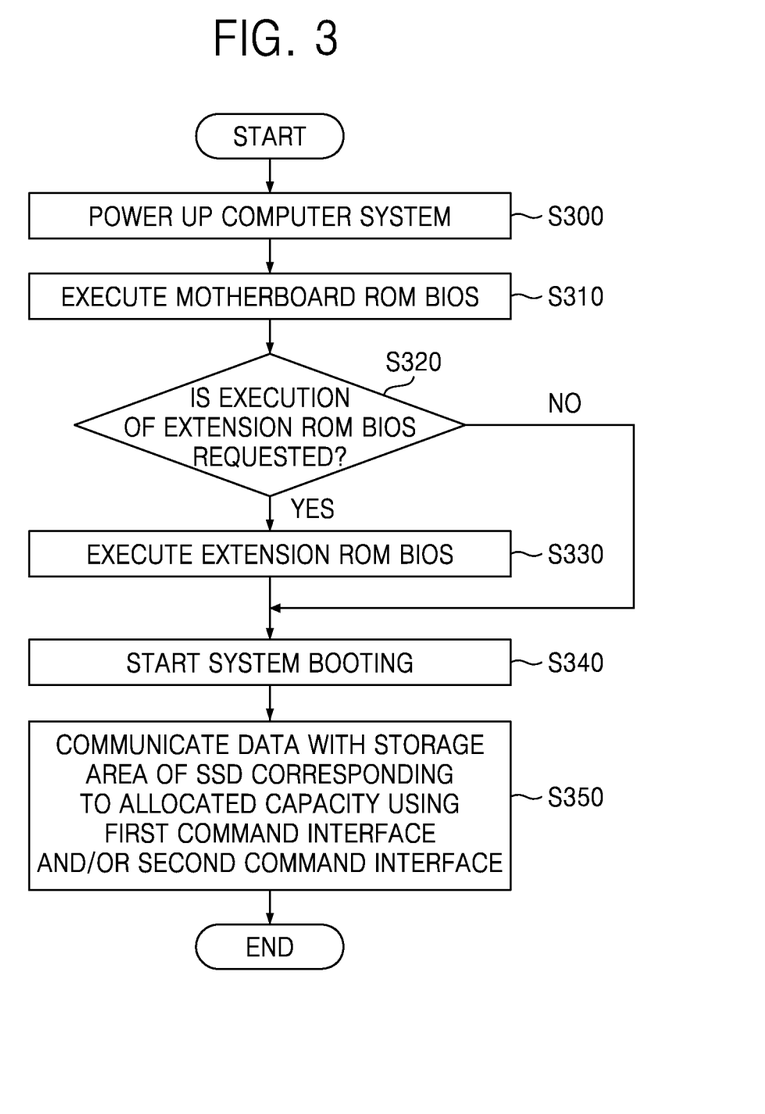
FIG. 3 is a flowchart of a control method of an SSD interface controller, according to embodiments of the inventive concept.

FIG. 3 is a flowchart of a control method of the SSD interface controller 130, according to embodiments of the inventive concept. Referring to FIGS. 2 and 3, booting starts when the computer system 100 including the SSD interface controller 130 is powered up in operation S300. A ROM BIOS mounted on a motherboard of the computer system 100 is executed in operation S310. Generally, when a system is powered up, a ROM BIOS usually carries out a power-on self-test (POST) to check and initialize peripheral devices (e.g., a disk drive and an input/output device) connected to the system. The ROM BIOS then boots up an operating system stored in an SSD of the system.

When there is a user's request to execute the extension ROM BIOS in operation S320, the host 110 may execute the extension ROM BIOS in operation S330. The extension ROM BIOS is not essential to system booting, but is used when the user wants or needs to change hardware settings before the start of the operating system. When the execution of the extension ROM BIOS is not requested by the user in operation S320, the host 110 does not execute the extension ROM BIOS (skipping operation S330). The operation of executing the extension ROM BIOS will be described in detail below.

Thereafter, the host 110 starts booting the computer system 100 according to the operating system stored in the SSD 140 in operation S340. When the system booting is completed, the first command interface 160 and/or the second command interface 170 of the SSD interface controller 130 may communicate data with a storage area of the SSD 140 in response to a command of the host 110 based on corresponding interface information (e.g., activation/deactivation and allocated SSD capacity) set in operation S310 and/or S330 regarding each command interface in operation S350. At this time, when the extension ROM BIOS has been executed and the interface information regarding each command interface has been changed, the first command interface 160 and/or the second command interface 170 of the SSD interface controller 130 may communicate data with the storage area of the SSD 140 in response to a command of the host 110 based on the changed interface information.

Figure 4:
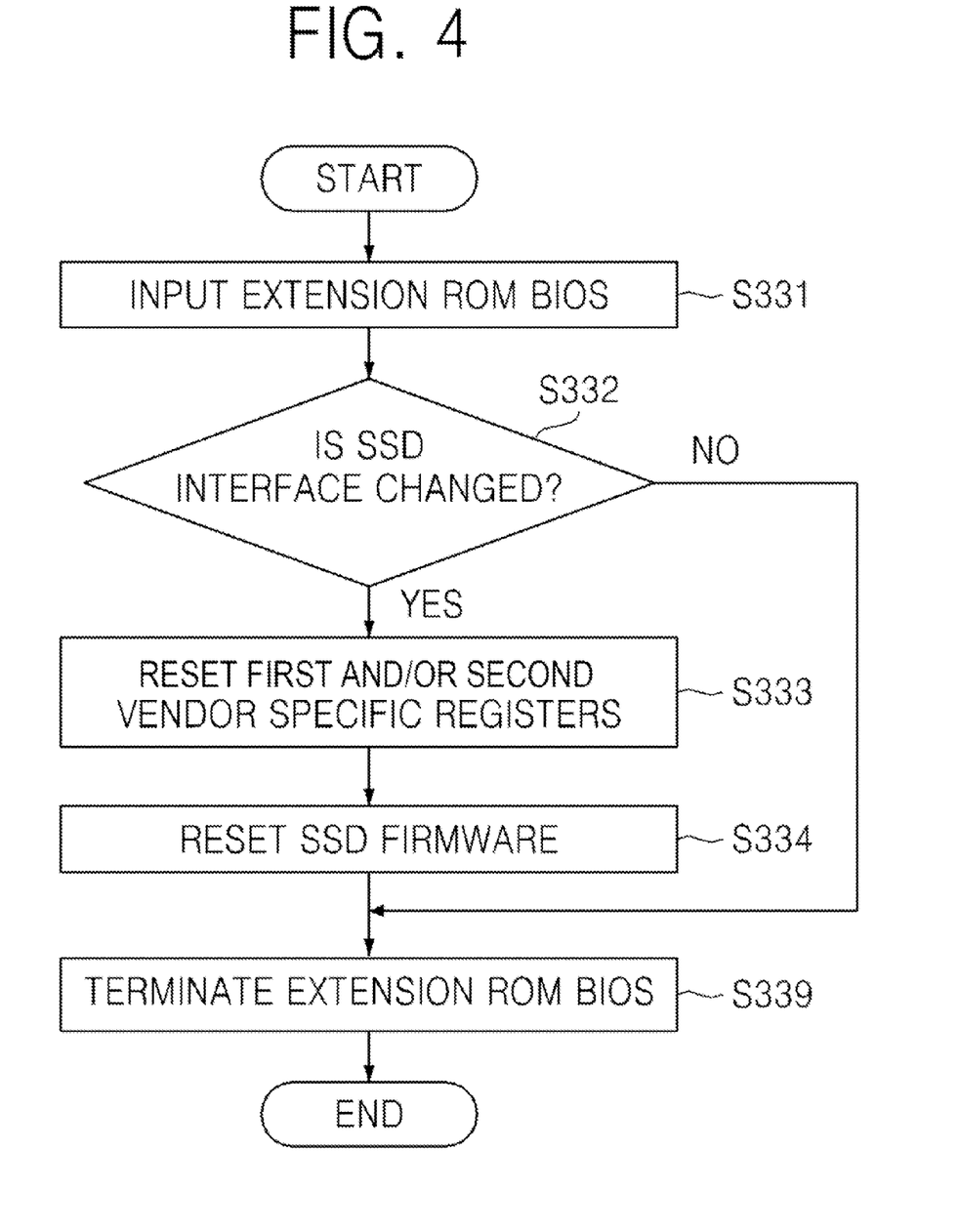
FIG. 4 is a flowchart of an operation for executing extension read-only memory basic input/output system (ROM BIOS) in the control method illustrated in FIG. 3, according to embodiments of the inventive concept.

FIG. 4 is a detailed flowchart of the operation of executing the extension ROM BIOS in the control method illustrated in FIG. 3, according to embodiments of the inventive concept. Referring to FIGS. 2 through 4, when execution of the extension ROM BIOS is requested by the user, the user may input information about a change in hardware, i.e., the extension ROM BIOS, in operation S331. In operation S332, it is determined whether the user input information changes the activation or deactivation and/or the allocated SSD capacity of one or more of the command interfaces 160 and 170 included in the SSD interface controller 130. When the user input information does change the activation or deactivation and/or the allocated SSD capacity of one or more of the command interfaces 160 and 170, the host 110 may reset the first and/or second vendor specific registers 180 and 190, storing the interface information IFS1 and IFS2 in the interface information storage unit 185, in operation S333.

For instance, it may be assumed that the total capacity of the SSD 140 is 512 gigabytes (GB), and that the user inputs an extension ROM BIOS that sets the SSD capacity allocated to the first command interface 160 to 384 GB and the SSD capacity allocated to the second command interface 170 to 128 GB. In this case, the first interface information IFS1, indicating that a bit determining the activation or deactivation of the first command interface 160 is logic high and that bits determining the allocated capacity of the SSD 140 (the SSD capacity allocated to the first command interface 160) represent 384 GB, is stored in the first vendor specific register 180 of the interface information storage unit 185, and the second interface information IFS2, indicating that a bit determining the activation or deactivation of the second command interface 170 is logic high and that bits determining the allocated capacity of the SSD 140 represent 128 GB, is stored in the second vendor specific register 190 of the interface information storage unit 185. The number of bits used to represent the allocated capacity of the SSD 140 may be determined depending on how elaborate the user wants to be in determining the allocated capacity of the SSD 140 within the capacity allowed for a vendor specific register.

In another example, it may be assumed that the user allocates the total 512 GB of the SSD 140 to the first command interface 160 and does not use the second command interface 170. In this case, the first interface information IFS1, indicating that a bit determining the activation or deactivation of the first command interface 160 is logic high and that bits determining the allocated capacity of the SSD 140 represent 512 GB, is stored in the first vendor specific register 180 of the interface information storage unit 185, and the second interface information IFS2, indicating that a bit determining the activation or deactivation of the second command interface 170 is logic low and that bits determining the allocated capacity of the SSD 140 represent 0 GB, is stored in the second vendor specific register 190 of the interface information storage unit 185.

When a value stored in the first vendor specific register 180 and/or the second vendor specific register 190 changes in operation S333, the host 110 resets SSD firmware in operation S334. For example, the SSD firmware may be a micro program that controls elements within the SSD chip 120. The activation or deactivation and/or the allocated SSD capacity of each command interface may be set in hardware by resetting the SSD firmware. Resetting the SSD firmware will be described in detail below.

After the firmware is reset in operation S334 or when the user does not input information changing the activation or deactivation and/or the allocation of SSD capacity of any of command interfaces included in the SSD interface controller 130 in operation S334, the execution of the extension ROM BIOS terminates in operation S339.

Figure 5:
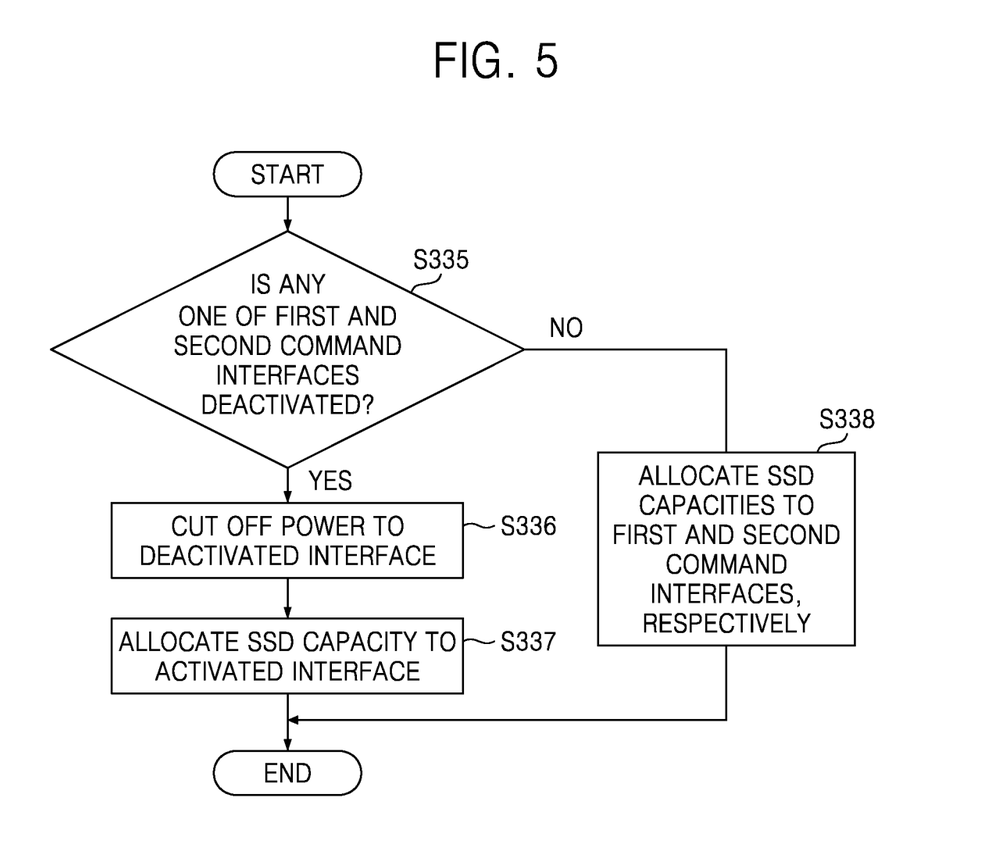
FIG. 5 is a flowchart of an operation for resetting SSD firmware associated with the flowchart illustrated in FIG. 4, according to embodiments of the inventive concept.

FIG. 5 is a detailed flowchart of the operation of resetting the SSD firmware illustrated in FIG. 4, according to embodiments of the inventive concept. Referring to FIGS. 2 through 5, after the first vendor specific register 180 and/or the second vendor specific register 190 are reset, the host 110 may receive the first interface information IFS1 stored in the first vendor specific register 180 and the second interface information IFS2 stored in the second vendor specific register 190 through the inner bus 150. The host 110 determines whether any one of the first and second command interfaces 160 and 170 is to be deactivated based on the first interface information IFS1 and the second interface information IFS2, respectively, in operation S335.

When any one of the first and second vendor specific registers 180 and 190 is deactivated, the host 110 requests the interface power management unit 175 to cut off power to the first or second command interface 160 or 170 that is deactivated. The interface power management unit 175 may cut off the power to the first or second command interface 160 or 170 that is deactivated in operation S336, using a power gating circuit or a switching unit, for example.

The first or second command interface 160 or 170 that is activated may be allocated a capacity of the SSD 140 according to multiple bits, included in the first or second interface information IFS1 or IFS2, to determine the allocated SSD capacity, in operation S337. The capacity of the SSD 140 allocated to the first or second command interface 160 or 170 may be arbitrarily designated by a user, but the sum of allocated SSD capacities cannot exceed the total capacity of the SSD 140.

When it is determined that neither of the first and second command interfaces 160 and 170 is deactivated in operation S335 (i.e., both the first and second command interfaces 160 and 170 are activated), bits determining activation or deactivation in the first interface information IFS1 and the second interface information IFS2, respectively, are both logic high, for example. In this case, the first command interface 160 may be allocated a capacity of the SSD 140 according to multiple bits included in the first interface information IFS1 to determine the corresponding allocated SSD capacity, and the second command interface 170 may be allocated a capacity of the SSD 140 according to multiple bits included in the second interface information IFS2 to determine the allocated SSD capacity, in operation S338.

Figure 6:
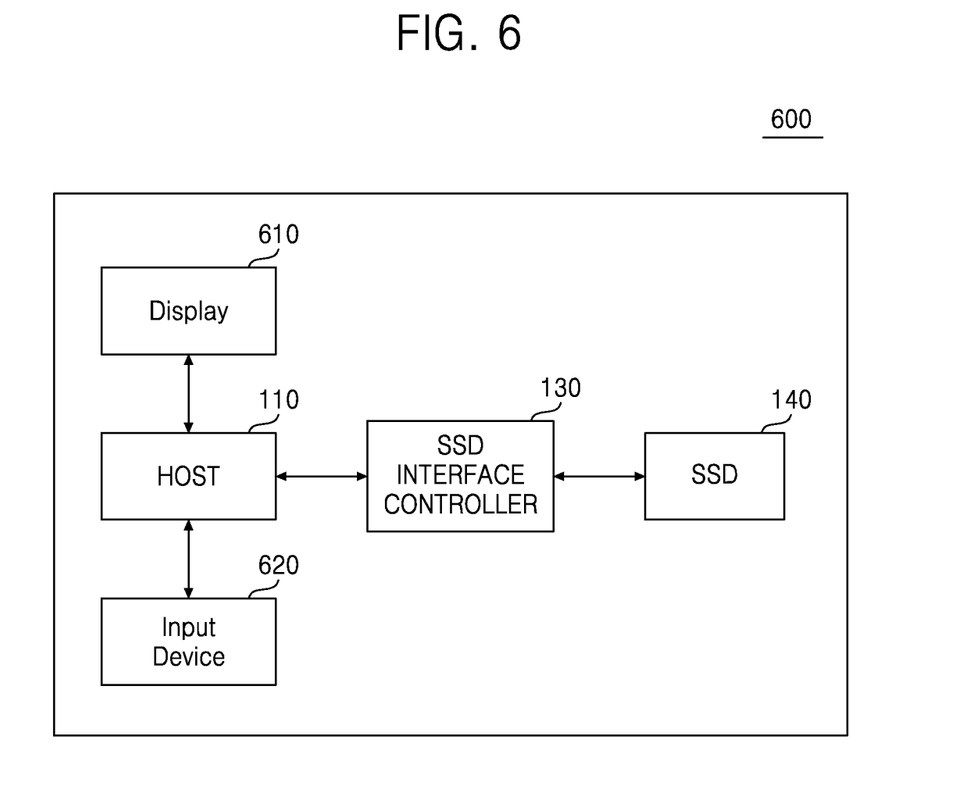
FIG. 6 is a block diagram of a computer system including the SSD interface controller illustrated in FIG. 2, according to embodiments of the inventive concept.

FIG. 6 is a block diagram of a computer system including the SSD interface controller illustrated in FIG. 2, according to embodiments of the inventive concept. Referring to FIG. 6, computer system 600 may be implemented as a personal computer (PC), a network server, a tablet PC, a net-book, an e-reader, a personal digital assistant (PDA), a portable multimedia player (PMP), an MP3 player, or an MP4 player, for example. The computer system 600 includes the host 110, the SSD 140, the SSD interface controller 130 for controlling the data processing operations of the SSD 140, a display 610 and an input device 620. The host 110 may display data stored in the SSD 140 through the display 610 according to data input through the input device 620. The input device 620 may be implemented by a pointing device, such as a touch pad or a computer mouse, a keypad, or a keyboard, for example.

The host 110 controls the overall operation of the computer system 600 and the operations of the SSD interface controller 130. The SSD interface controller 130, which controls the operations of the SSD 140, may be implemented as a part of the host 110 or as a separate chip or device.

Figure 7:
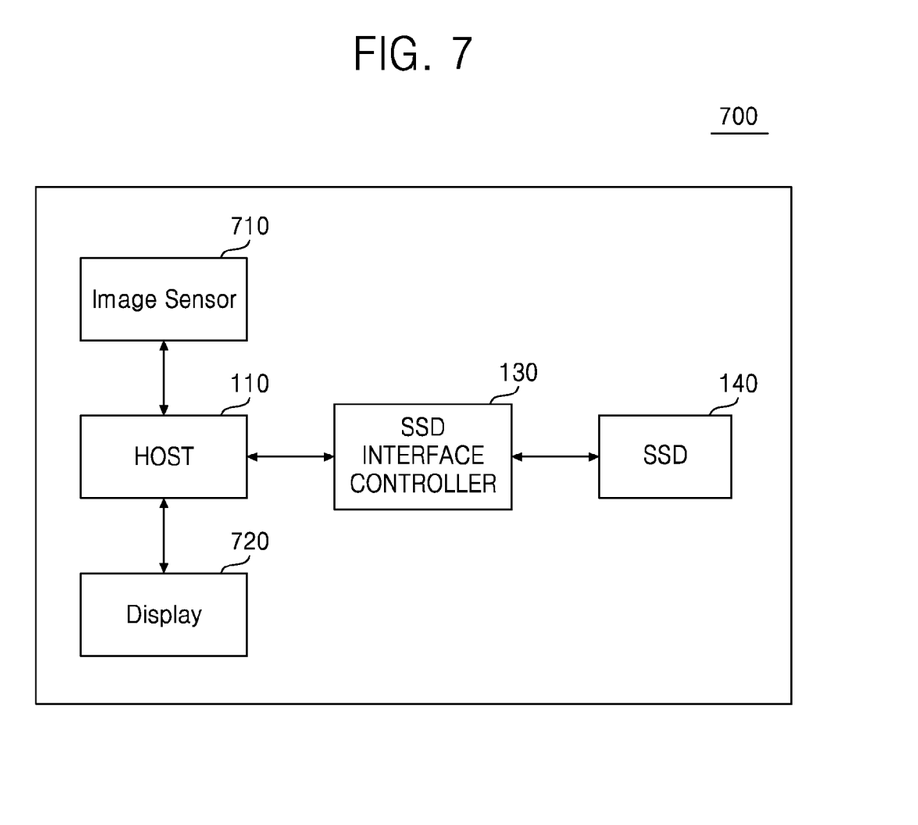
FIG. 7 is a block diagram of a computer system including the SSD interface controller illustrated in FIG. 2, implemented, for example, as an image processor device, according to other embodiments of the inventive concept.

FIG. 7 is a block diagram of a computer system including the SSD interface controller illustrated in FIG. 2, according to other embodiments of the inventive concept. Referring to FIG. 7, computer system 700 may be implemented as an image processor device, such as a digital camera, a cellular phone equipped with a digital camera, a smart phone equipped with a digital camera, or a tablet PC equipped with a digital camera, for example. The computer system 700 includes the host 110, the SSD 140 and the SSD interface controller 130 for controlling the data processing operations, such as a program operation, an erase operation, and a read operation, of the SSD 140. The computer system 700 further includes an image sensor 710 and a display 720.

The image sensor 710 included in the computer system 700 converts optical images into digital signals and outputs the digital signals to the host 110 or the SSD interface controller 130. The digital signals may be controlled by the host 110 to be displayed through the display 720 and/or stored in the SSD 140 through the SSD interface controller 130. Data stored in the SSD 140 may be displayed through the display 720 under control of the host 110 or the SSD interface controller 130. The SSD interface controller 130, which controls the operations of the SSD 140, may be implemented as a part of the host 110 or as a separate chip or device.

Figure 8:
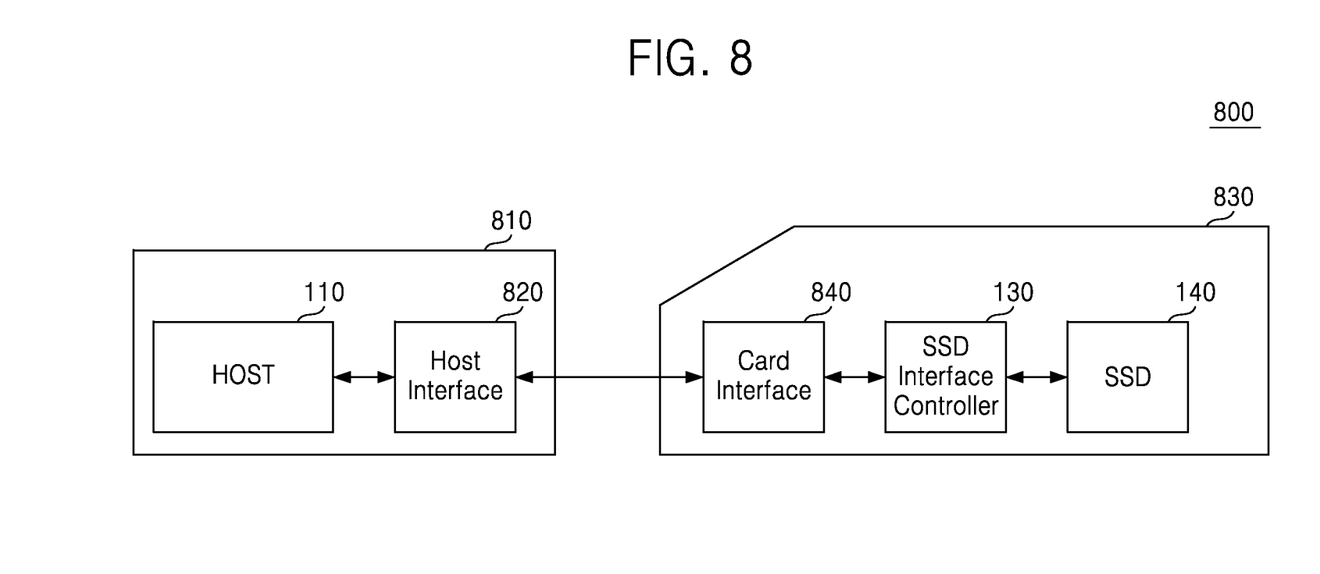
FIG. 8 is a block diagram of a computer system including the SSD interface controller illustrated in FIG. 2, implemented, for example, as a host computer and a memory card or smart card, according to further embodiments of the inventive concept.

FIG. 8 is a block diagram of a computer system including the SSD interface controller illustrated in FIG. 2, according to further embodiments of the inventive concept. Referring to FIG. 8, computer system 800 may be implemented as a host computer and a memory card or a smart card, for example. The computer system 800 includes a host computer 810 and a memory card 830.

The host computer 810 includes the host 110 and a host interface 820. The host computer 810 may be a PC, a tablet PC, a digital camera, a digital audio player, a cellular phone, a console video game hardware or a digital set-top box, for example.

The memory card 830 includes the SSD 140, the SSD interface controller 130, and a card interface 840. The SSD interface controller 130 controls an exchange of data between the SSD 140 and the card interface 840. The card interface 840 may be a secure digital SD™ card interface or a multimedia card (MMC) interface, for example, but the inventive concept is not restricted to these embodiments. When the memory card 830 is connected with the host computer 810, the card interface 840 interfaces the host 110 and the SSD interface controller 130 for data exchange according to the protocol of the host 110. For example, the card interface 840 may support a universal serial bus (USB) protocol or an interchip (IC)-USB protocol. Here, the card interface 840 may indicate hardware supporting a protocol used by the host computer 810, software installed in the hardware, or a signal transmission mode, for example. When the host interface 820 of the host computer 810 and the card interface 840 of the memory card 830 are connected, the host interface 820 may perform data communication with the SSD 140 through the card interface 840 and the SSD interface controller 130 under control of the host 110.

Embodiments of the inventive concept may include computer-readable codes on a computer-readable medium. The computer-readable recording medium is any data storage device capable of storing data as a program, which can be read by a computer system or computer processor. Examples of the computer-readable recording medium include read-only memory (ROM), random-access memory (RAM), compact disc ROMs (CD-ROMs), magnetic tapes, floppy disks, solid state storage devices and optical data storage devices.

The computer-readable recording medium can also be distributed over network coupled computer systems, so that the computer-readable code is stored and executed in a distributed fashion. Also, specific functional programs, codes and code segments for implementing the embodiments of inventive concept are within the purview of a computer programmer of ordinary skill in the art.

As described above, according to embodiments of the inventive concept, an SSD interface controller determines activation or deactivation status of each of multiple interfaces, and a capacity allocated to each interface based on interface information stored in an interface information storage unit, thereby realizing efficient data transmission between a host and an SSD.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed:

1. A solid state drive (SSD) interface controller comprising:
 a host interface configured to communicate data with a host device;
 a first command interface configured to communicate data between the host interface and an SSD;
 a second command interface configured to communicate data between the host interface and the SSD independently of the first command interface; and
 an interface information storage unit configured to store information for determining activation or deactivation of each of the first and second command interfaces, and a capacity of the SSD allocated to each of the first and second command interfaces.

2. The SSD interface controller of claim 1, wherein the interface information storage unit comprises:
a first vendor specific register storing first interface information corresponding to the first command interface; and
a second vendor specific register storing second interface information corresponding to the second command interface.

3. The SSD interface controller of claim 2, wherein at least one of the first interface information and the second interface information is changed in response to an extension read-only memory basic input/output system (ROM BIOS) executed during a booting operation.

4. The SSD interface controller of claim 1, wherein:
the host interface is configured to communicate data with the host device according to a first protocol;
the first command interface is configured to communicate data with the SSD according to a second protocol; and
the second command interface is configured to communicate data with the SSD according to a third protocol different from the first and second protocols.

5. The SSD interface controller of claim 4, wherein the first protocol comprises peripheral component interconnect express (PCIe) protocol.

6. The SSD interface controller of claim 5, wherein the second protocol comprises one of a serial advanced technology attachment (SATA) protocol or a SATA express protocol, and the third protocol comprises a non-volatile memory express protocol.

7. The SSD interface controller of claim 1, wherein a sum of the capacity allocated to the first command interface and the capacity allocated to the second command interface is equal to a total capacity of the SSD.

8. The SSD interface controller of claim 2, further comprising:
an interface power management unit configured to cut off a power supply to at least one of the first command interface and the second command interface when the at least one of the first command interface and the second command interface is deactivated based on the first interface information and the second interface information, respectively.

9. The SSD interface controller of claim 1, wherein the SSD comprises:
a plurality of non-volatile memories configured to store data communicated from at least one of the first command interface and the second command interface.

10. A method of controlling communication of data between a host and a solid state drive (SSD), the method comprising:
receiving first interface information corresponding to a first command interface from an interface information storage unit;
receiving second interface information corresponding to a second command interface from the interface information storage unit;
determining a first activation status and a first allocated capacity of the first command interface according to the first interface information, the first allocated capacity corresponding to a portion of a total capacity of the SSD;
determining a second activation status and a second allocated capacity of the second command interface according to the second interface information; and
communicating the data between the host and the SSD via at least one of the first and second command interfaces in accordance with the first and second activation statuses and the first and second allocated capacities, respectively.

11. The method of claim 10, further comprising:
cutting off power to at least one of the first command interface and the second command interface having a corresponding first activation status or second activation status, respectively, indicating deactivation.

12. The method of claim 10, further comprising:
receiving a request to execute an extension read-only memory basic input/output system (ROM BIOS) following power-up of the SSD; and
changing at least one of the first interface information and the second interface information in response to the execution of the extension ROM BIOS.

13. The method of claim 12, further comprising:
resetting the interface information storage unit in response to changing the at least one of the first interface information and the second interface information.

14. The method of claim 13, further comprising:
resetting SSD firmware in response to changing the at least one of the first interface information and the second interface information; and
terminating the execution of the extension ROM BIOS.

15. The method of claim 10, wherein communicating the data between the host and the SSD via at least one of the first and second command interfaces comprises:
communicating between the first command interface and the SSD using a first interface protocol; and
communicating between the second command interface and the SSD using a second interface protocol different from the first interface protocol.

16. The method of claim 15, wherein the first interface protocol comprises one of serial advanced technology attachment (SATA) protocol, SATA express protocol, or non-volatile memory express protocol, and the second interface protocol comprises a different one of the SATA protocol, the SATA express protocol, or the non-volatile memory express protocol relative to the first interface protocol.

17. A solid state drive (SSD) interface controller, comprising:
a plurality of command interfaces configured to communicate data between a host interface and an SSD;
a plurality of registers configured to store interface information corresponding to the plurality of command interfaces, the interface information indicating whether each of the plurality of command interfaces is activated or deactivated, and allocating a capacity to each of the plurality of command interfaces, each capacity corresponding to a portion of a total capacity of the SSD; and
an interface power management unit configured to remove power from each of the plurality of command interfaces that is deactivated according to the corresponding interface information.

18. The SSD interface controller of claim 17, wherein the plurality of command interfaces have a corresponding plurality of different interface protocols.

19. The SSD interface controller of claim 17, wherein the plurality of registers are further configured to receive changes to the corresponding interface information in response to an extension read-only memory basic input/output system (ROM BIOS) executed during a booting operation.

20. The SSD interface controller of claim 17, wherein a sum of the capacities allocated to the plurality of command interfaces is equal to the total capacity of the SSD.

* * * * *